Dec. 4, 1962 L. B. ROSENDAHL 3,066,785
MAGNETIC ARTICLE HANDLING APPARATUS
Filed Dec. 30, 1959 2 Sheets-Sheet 1
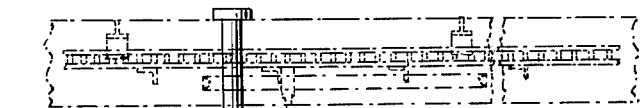
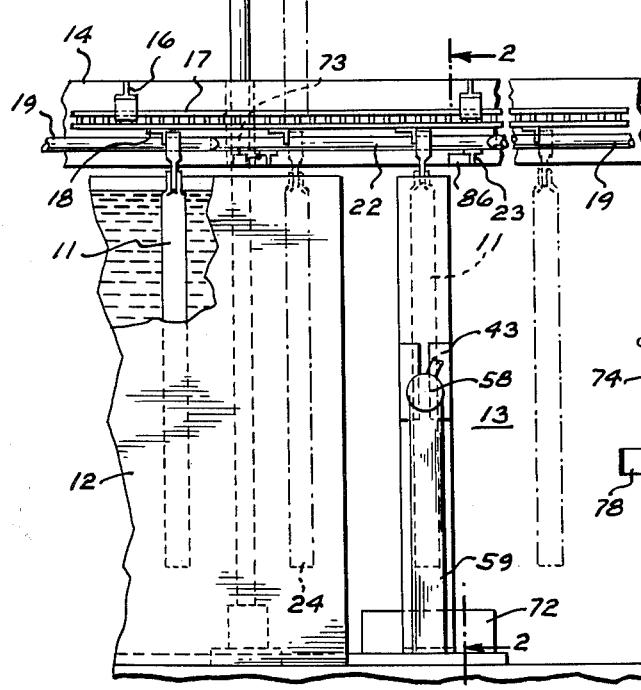
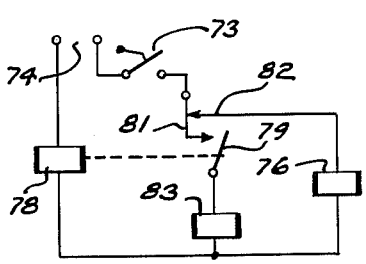
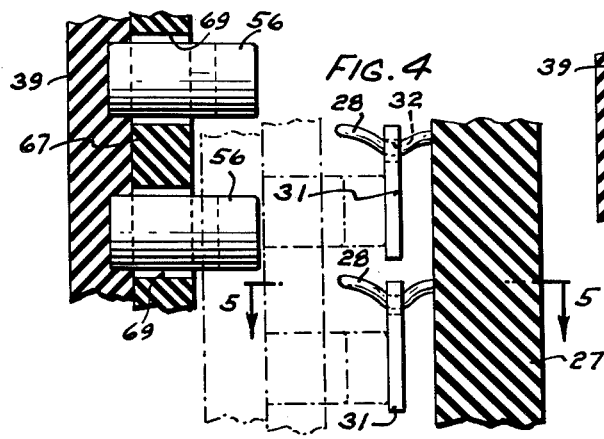
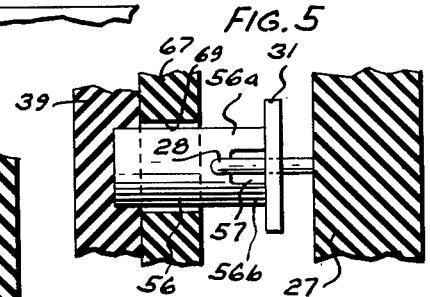
INVENTOR
L.B. ROSENDAHL
BY
A.C. Schwarz Jr
ATTORNEY

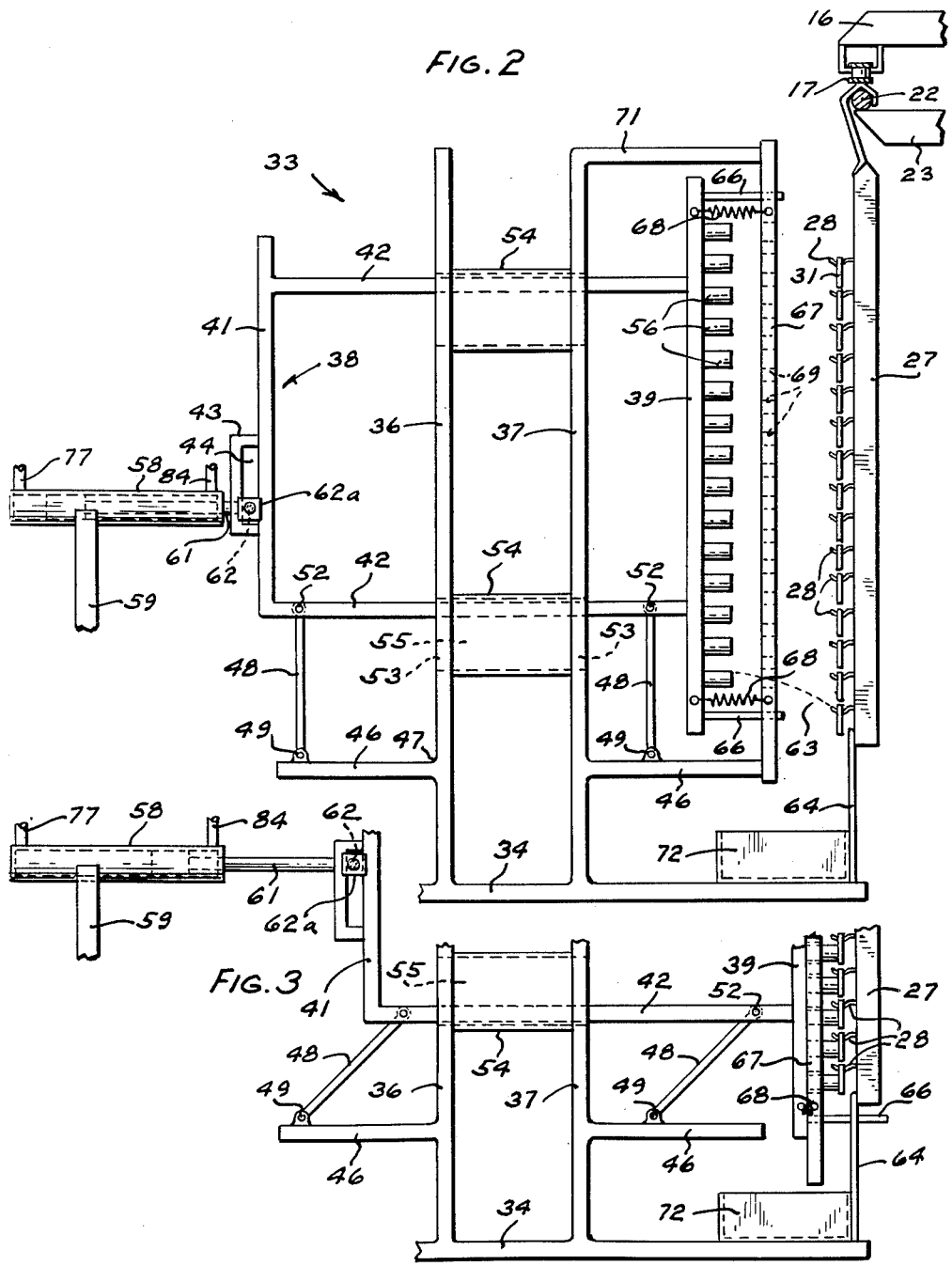

3,066,785
MAGNETIC ARTICLE HANDLING APPARATUS
Lawrence B. Rosendahl, Oklahoma City, Okla., assignor to Western Electric Company, Incorporated, New York, N.Y., a corporation of New York
Filed Dec. 30, 1959, Ser. No. 862,826
2 Claims. (Cl. 198—27)

This invention relates to an improvement in a magnetic article handling apparatus, and more particularly to an apparatus especially suitable for removing articles from a carrier wherein spaced hooks having upwardly extending outer ends are utilized for supporting articles on the carrier.

Magnetic article handling apparatus are known in which a magnetic article carrier moves articles along a predetermined path to an unloading station. At the unloading station a horizontally reciprocating magnetic article unloading device, of greater magnetic force than the carrier, is moved toward the carrier into juxtaposition therewith to engage the articles and remove them from the carrier upon being moved in the reverse direction. Such an apparatus is disclosed in application Serial No. 805,608, now Patent No. 3,023,879, filed April 10, 1959, by A. S. Cafferty and L. B. Rosendahl.

In certain instances however, it is desirable to support articles on a non-magnetic carrier, in which case it becomes necessary to provide upwardly extending hooks on the carrier upon which the articles may be suspended so that they will not fall from the carrier prior to their reaching the unloading station. Under these circumstances, known apparatus, in which the unloading device is reciprocated in only a horizontal plane, will not function properly to remove the articles from the hooks because as the unloading device is moved away from the carrier the upwardly extending outer ends of the hooks will engage the articles and interfere with their removal from the carrier. Therefore, it is desirable to provide a device for positively removing articles from the carrier which not only moves horizontally but which also moves in a vertical direction to lift the articles to be removed up and over the outer ends of the upwardly extending or curved supporting hooks.

It is an object of this invention to provide a new and improved magnetic article handling apparatus.

It is another object of this invention to provide a magnetic unloading device which cooperates with an article carrier having an upwardly extending or curved article supporting hook, to remove an article from the carrier.

A further object of this invention is to provide a magnetic unloading device for removing an article from an upwardly extending or curved article supporting hook on a carrier, wherein the magnetic unloading device and a stripper plate are moved in an arcuate path into juxtaposition with the carrier to transfer the articles from the carrier to the unloading device, after which the unloading device and the stripper plate are moved away from the carrier in the arcuate path in the reverse direction, and the stripper plate subsequently functions to remove the articles from the unloading device.

With these and other objects in view, the present invention contemplates a non-magnetic carrier or rack having upwardly extending or curved hooks for moving paramagnetic articles along a predetermined path through article fabricating stations and an unloading station. Movably mounted at the unloading station is an unloading device having a plurality of magnets extending therefrom and through apertures formed in a stripper plate. Upon movement of a rack into the unloading station, a means is actuated for moving the unloading device and stripper plate in a downward arcuate path into juxtaposition with the rack. After a predetermined time delay, the unloading device is moved away from the rack upwardly in the same arcuate path, raising the articles up and over the outer upper ends of the upwardly extending or curved supporting hooks. As the unloading device continues its reverse movement it is separated from the stripper plate thereby stripping the articles from the magnets and allowing the articles to fall into a container.

Other objects, advantages and novel aspects of the invention will become apparent upon consideration of the detailed description in conjunction with the accompanying drawings wherein:

FIG. 1 is a fragmentary elevational view of an apparatus for moving article carrying hook racks along a path through article fabricating stations and into an unloading station in accordance with the purpose of the present invention;

FIG. 2 is a side view, looking in the direction of the arrows 2—2 in FIG. 1, disclosing the details of a magnetic unloading device before movement toward the article carrying hook rack;

FIG. 3 is a side view, with a portion cut away, of the unloading device disclosed in FIG. 2 after the movement toward and into engagement with the articles on the hook rack;

FIG. 4 is an enlarged fragmentary side view partially in cross-section, disclosing in solid lines a portion of the unloading device and a stripper plate approaching the hook rack, and showing in dashed lines the magnets of the unloading device disposed between the hooks on the article carrying rack and engaging the articles to be removed;

FIG. 5 is a fragmentary top view taken along the line 5—5 in FIG. 4 showing the magnets in engagement with the articles to be removed; and FIG. 6 is a diagram of a circuit for operating the unloading device shown in the other figures.

Attention is now directed to FIG. 1 wherein is shown a conveyor system, generally designated by the numeral 10, for moving article carrying hook racks 11 along a predetermined path and through a series of stations which may include a plurality of article cleaning, plating and rinsing tanks 12 and an article unloading station 13. The conveyor system may comprise a support plate 14 having brackets 16 mounted thereon for supporting a movable chain 17. The chain 17 is provided with right angle members 18 which push the hook racks 11 along a stationary guide rod 19 positioned above the tank 12.

The support plate 14 and chain 17 are movable up and down a series of shafts 21, one of which is shown in FIG. 1, from the solid line position to the dotted line position shown in FIG. 1, by structure (not shown) including a chain and sprocket mechanism supported on a suitable framework and operated by an electric motor. A section 22 of the rod 19 is mounted on the support plate 14 by means of brackets 23 for movement with the plate 14. The rod section 22 extends from a position over the end portion of the tank 12 to a position over the unloading station 13 whereafter another portion of the stationary guide rod 19 is provided.

When the plate 14 and chain 17 are in the solid line position shown in FIG. 1, the chain is moved (by means not shown) to push the hook racks 11 along the rod 19 and through the solution within the tank 12. When the chain 17 moves the last rack 11 within the tank 12 to the dotted line position 24 and the rack is thus positioned on the section 22 of the rod 19, the plate 14, chain 17 and rod section 22 are moved upwardly to the dotted line position 26 by the aforementioned chain and sprocket mechanism (not shown), such that the lower extremity of the rack is positioned above the walls of the tank 12. The chain 17 is again moved to position the rack directly over the unloading station 13, whereafter the plate 14, chain 17 and rod section 22 are again lowered thereby placing the rack 11 within the unloading station.

After articles are removed from the rack 11 positioned within the unloading station, the chain 17 again moves the rack 11 onto the continuation of stationary rod 19. Simultaneously with such movement, a subsequent rack 11 is moved within the plating tank 12 to the dotted line position 24 and onto the rod section 22 whereafter the sequence of operation is repeated. It is to be understood that the above apparatus for moving the racks is merely illustrative of one type of apparatus that may be used and that many other types of carriers or conveyors may be utilized.

The rack 11 may consist of a non-magnetic bar member 27 to which is secured a vertical row of hooks 28. The articles 31 are carried on the hooks 28 by any suitable means, as for example, an aperture 32 (FIG. 4) formed therein.

FIGS. 2 and 3 disclose the details of the improved unloading device, generally designated by the numeral 33, which is positioned in the unloading station 13. The improved unloading device 33 comprises a base plate 34, a pair of upright supports 36 and 37 mounted on the base plate, and a frame, generally designated by the reference numeral 38, and in turn mounted on the upright supports 36 and 37.

The frame 38 includes a front vertical mounting plate 39 and a vertical rear member 41 secured together in spaced parallel relation by horizontal parallel rods 42. Suitably secured to the rear member 41 are a pair of spaced U-shaped brackets 43 which form spaced vertical slots 44, for a purpose to be subsequently described.

The means for mounting frame 38 on the uprights 36 and 37 includes laterally extending support members 46 secured to the uprights at 47. Frame 38 is pivotally mounted on the support members 46 by means of parallel linkage 48 pivoted to the support members at 49 and pivoted to the lower rod 42 at 52. The uprights 36 and 37 are provided with spaced vertically elongated slots 53 and a pair of bushings 54 are positioned between the uprights in vertically spaced relation and each provided with a slot 55 elongated in a vertical direction and aligned with the slots 53. The slots 53, 55 slidably receive a respective rod 42, and because of their vertically elongated construction, allow vertical as well as horizontal movement of the rods therein.

The mounting plate 39 on the frame 38 is provided with a plurality of magnets 56, which may be permanent magnets, having one extremity embedded in the mounting plate and the other extremity thereof extending toward the path of movement of the racks 11. The magnets 56 are provided with centrally located slots 57 (FIG. 5) in alignment with the hooks 28 to facilitate movement of the magnets between the hooks to engage and remove the articles 31. In this respect, as the magnets 56 move toward and away from the rack 11, the hooks 28 can pass through the slots 57 between the laterally spaced side portions 56a, 56b of the magnets formed by said slots, without engaging the magnets and hindering their movement.

Movement of the frame 38 toward and away from the rack 11 is accomplished by an air cylinder 58 secured by welding or the like to the base plate 34 by means of a vertical support 59 (FIGS. 1, 2 and 3) and having a piston rod 61 movable therein and secured to the frame 38 between the brackets 43 by a bolt 62. The bolt 62, which has an enlarged head 62a, extends through an aperture formed in the end of the piston rod 61 and through the vertically elongated slots 44, the slots 44 thereby allowing vertical movement of the frame 38 relative to the air cylinder 58. The bolt 62 is prevented from passing back through the slots 44 and the piston rod aperture by having a nut (not shown) threaded on its end opposite the enlarged end, or by any suitable means.

As the frame 38 is moved by the piston rod 61 toward the rack 11 in the unloading station 13 the frame 38 and magnets 56 travel downwardly in an arcuate path by virtue of the parallel linkage 48, as designated by the dotted line at 63 in FIG. 2, from the position shown in FIG. 2 to the position shown in FIG. 3. Similarly, as the frame 38 is moved away from the rack 11 with the articles 31 secured to the magnets 56, it travels upwardly in the same arcuate path 63, in the reverse direction, whereby the articles are lifted up and over the outer ends of the hooks 28. A brace 64 mounted on the base plate 34 acts as a stop and holds and prevents the rack 11 from swinging outwardly upon the movement of the frame 38 and the magnets 56 away from the rack.

A pair of pins 66 extend from the mounting plate 39 for slidably mounting a stripper plate 67 which is urged toward the mounting plate by means of tension spring 68. The stripper plate 67 is provided with a plurality of apertures 69 formed therein which are in alignment with the magnets 56. The stripper plate 67 is held in spaced relationship to the mounting plate 39 by the lower support member 46 and a similar member 71 projecting from the upright support 37 at the top thereof, when the frame 38 is retracted by the piston rod 61 to the position shown in FIG. 2.

Upon the piston rod 61 moving the frame 38 and magnets 56 toward a rack 11 positioned in the unloading station 13, the mounting plate 39 moves toward the stripper plate 67 until the magnets extend through the apertures 69 formed in the stripper plate. As the mounting plate 39 continues its movement toward the rack 11, the stripper plate 67 is engaged by the mounting plate and is carried thereby toward the rack. As disclosed in FIGS. 3 through 5, the magnets 56 are of a sufficient length to extend through and project beyond the stripper plate 67 whereby the magnets 56 engage a group of paramagnetic articles 31 held by the rack 11.

Upon the return movement of the mounting plate 39 to the retracted position away from the rack 11, the mounting plate 39 and the stripper plate 67 move toward the left as viewed in FIGS. 2 and 3 until the members 46, 71 engage and hold the stripper plate. As the mounting plate 39 and magnets 56 continue to move, the stripper plate 67 and mounting plate are separated and the magnets are withdrawn through the apertures 69 in the stripper plate. The movement of the magnets 56 out of the apertures 69 causes the articles 31 to be removed from the magnets by engaging the stripper plate 67 because the articles are of a sufficient size to prevent the movement thereof through the apertures 69. A pan 72 is positioned beneath the lower support member 46 on the base plate 34 to catch the articles 31 as they are removed from the magnets.

In the operation of the above-described apparatus, a magnetic rack 11 is lowered into the unloading station 13 by the conveyor system 10 as described in conjunction with FIG. 1 whereby contacts of a switch 73 (FIG. 6) mounted on the shaft 21 are closed by the bracket 23 (FIG. 1). At this time, the mounting plate 39 and magnets 56 are in the retracted position as disclosed in FIG. 2. Upon closure of the contacts of the switch 73, a circuit is energized from a source of electrical power connected to terminals 74 to operate a solenoid 76 which operates an air valve (not shown) to force air into an inlet 77 on the air cylinder 58 to move the piston rod 61, frame 38 and magnets 56 toward the rack 11. Upon the closure of the contacts of the switch 73, current is also passed through the windings of a time delay relay 78. Relay 78 is of a slow-to-operate type which introduces a time delay between the energizing of its windings and the closing of its contacts 79, 81. The mounting plate 39 and magnets 56 continue to move downward toward the rack 11 carrying the stripper plate 67 therewith, until the piston rod 61 reaches the end of its stroke by which time the magnets 56 have moved into engagement with the articles 31 on the rack 11 as disclosed in FIG. 3. After a predetermined time delay, the relay 78 pulls up the contact 79 into engagement with contact 81 and contacts 81 and 82 are opened. The closing of contacts 79 and 81 energizes a solenoid 83 and at the same time retains the relay 78 in an operated condition. The opening of contacts 81 and 82 breaks the energizing circuit for the solenoid 76, thereby preventing air from entering the inlet 77. The energization of solenoid 83 operates an air valve (not shown) to admit air into an inlet 84 on the air cylinder 58 which moves the piston rod 61 and therefore the mounting plate 39 and magnets 56 toward the left to the retracted position away from the rack 11 with the articles 31 attracted to the magnets 56. As the mounting plate, magnets and stripper plate 67 move to the retracted position, the movement of the stripper plate is halted by the members 46, 71, separating the stripper plate from the mounting plate 39 and stripping the articles 31 from the magnets 56.

Other embodiments of the unloading device 33 may be obtained with the use of electromagnets instead of permanent type magnets 56. With the use of electromagnets, the operation of the device is the same as set forth hereinabove but the stripper plate is eliminated altogether and the electromagnets are energized by the switch 73 and de-energized by a second switch 86 (FIG. 1) on the bracket 23, which is closed on movement of the rack 11 out of the unloading station 13. The switch 86 operates a relay (not shown) which opens a normally closed contact (not shown) in the circuit to the electromagnets to thereby de-energize said circuit.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Magnetic article handling apparatus for removing paramagnetic articles from a rack wherein the rack includes a plurality of article-supporting hooks having outer upturned ends for carrying the articles on the rack which apparatus comprises a mounting member having a plurality of magnets extending therefrom, means supporting said mounting member in an unloading station for movement through an arcuate path toward and away from the rack, a stripper member slidably carried on said mounting member and having apertures formed therein for receiving said magnets therethrough, means biasing said stripper member toward said mounting member so that as said mounting member moves downward through said arcuate path toward the rack said magnets move through the apertures to extend beyond said stripper member, means for moving said mounting member and said stripper member downward through said arcuate path into juxtaposition with the rack so that said magnets engage the articles on the hooks, and for moving said mounting member and said stripper member upward away from the rack through said arcuate path whereby the articles are removed from the hooks by said magnets, and means for subsequently interrupting the movement of said stripper member while said mounting member moves away from the rack, to separate said stripper member and said mounting member so that said stripper member removes the articles from said magnets.

2. Magnetic article handling apparatus for removing paramagnetic articles from a rack wherein the rack includes a row of spaced article-supporting hooks having outer upturned ends for carrying the articles on the rack, which apparatus comprises an upstanding support, horizontally-extending bushing means on said support, horizontally-extending rod means extending through said bushing means, a mounting member mounted on said rod means, a row of magnets extending from said mounting member with adjacent ones of said magnets being spaced apart a distance substantially equal to the spacing of corresponding ones of the hooks, a stripper member slidably carried on said mounting member and having apertures formed therein through which said magnets may extend, resilient means biasing said stripper member toward said mounting member whereby said magnets normally extend through the apertures, parallelogram linkage mounting said rod means on said support whereby said mounting member and said stripper member are movable through an arcuate path toward and away from the rack, means for moving said mounting member and said stripper member downward through said arcuate path into juxtaposition with the rack whereby said magnets engage the articles on the hooks, and for moving said mounting member and said stripper member upward away from the rack through arcuate path whereby the articles are removed from the hooks by said magnets, and means for interrupting the movement of said stripper member to separate said stripper member and said mounting member for removing the articles from said magnets.

References Cited in the file of this patent

UNITED STATES PATENTS

| | | |
|---|---|---|
| 992,665 | Hillstrom | May 16, 1911 |
| 1,251,732 | Anderson | Jan. 1, 1918 |
| 2,119,725 | Stecher | June 7, 1938 |
| 2,431,265 | Madsen | Nov. 18, 1947 |
| 2,431,320 | Fischer | Nov. 25, 1947 |
| 2,840,219 | Mervyn et al. | June 24, 1958 |
| 2,885,063 | Austin | May 5, 1959 |